Aug. 17, 1965 J. E. VARGA 3,201,667

TITANIUM DIOXIDE CAPACITOR AND METHOD FOR MAKING SAME

Filed Dec. 20, 1960 3 Sheets-Sheet 1

INVENTOR
Joseph E. Varga

BY
Stevens, Davis, Miller & Mosher
ATTORNEYS

INVENTOR
Joseph E. Varga

BY
Stevens, Davis, Miller & Mosher
ATTORNEYS

United States Patent Office 3,201,667

Patented Aug. 17, 1965

3,201,667

TITANIUM DIOXIDE CAPACITOR AND METHOD FOR MAKING SAME

Joseph E. Varga, Dallas, Tex., assignor to Texas Instruments Incorporated, Dallas, Tex., a corporation of Delaware Filed Dec. 20, 1960, Ser. No. 77,204
9 Claims. (Cl. 317—258)

This invention relates to capacitors and, more particularly to capacitive devices formed integrally with or in composite relationship to semiconductor members.

In the electrical component arts, efforts have been continually made to improve electrical characteristics while decreasing physical size. Thus, with the ever increasing emphasis on higher and higher electrical frequencies, and with the accompanying need for smaller and smaller size, there has been an increasing emphasis on improvement in voltage breakdown, power factor and miniaturization.

One significant breakthrough in accomplishing the foregoing objectives is that of forming all components of an operative electrical circuit (including interconnections) within a single wafer of semiconductor material. Thus, for example, in Patent No. 3,138,743, which issued June 23, 1964, and assigned to the same assignee as the present invention, there is disclosed such an arrangement by whose practice the physical size of completed circuits can be reduced several fold.

Although practice of the referenced invention has led to minimized size, certain problems have arisen in most advantageously exploiting the principles thereof. Thus, for example, in certain low frequency embodiments, optimum capacitor sizes have been difficult to attain without exceeding otherwise desired physical geometries. This has occurred principally because of the tiny sizes involved and the fact that with given electrode spacing and dielectric, capacitance varies directly as the effective electrode areas. Since the maximum potential for miniaturization can be realized in semiconductor networks only when extremely small geometries are involved, it is desired to allocate only exceedingly small areas for capacitor electrodes. Consequently, in order to achieve relatively high values of capacitance, it is necessary to do one or both of the following:

(1) Increase the permittivity of the dielectric material; and/or (2) Decrease the electrode spacing.

Unfortunately, decreases in electrode spacing tend to produce corresponding decreases in voltage breakdown ratings. Thus, in any practical embodiment, there is a limit beyond which the electrode spacing cannot be decreased. Any further decrease in size or increase in capacitance must be obtained by increasing the permittivity of the dielectric employed.

The available literature indicates that the tetragonal single crystal structure of titanium dioxide has a high dielectric constant. However, before the high dielectric constant of titanium dioxide can be utilized for fabricating small geometry capacitors, a process for forming the aforementioned crystal structure into useful films must be available.

The films, in order to be useful as a dielectric in small geometry capacitors, must have the properties of nonporosity, tetragonal single crystal structure, and minimum thickness.

It has been discovered that by evaporating a mixture of titanium and titanium dioxide onto a suitable substrate and subsequently oxidizing the deposit, a film can be produced using relatively low temperatures that satisfies the above requirements for a superior, small geometry, capacitor dielectric. Utilizing the evaporative process hereinafter described yields new capacitor designs having higher breakdown voltages and higher capacitance values than heretofore attainable.

In preparing thin dielectric films the problem of avoiding formation of pinholes or other abnormalities which constitute areas of weakness and leakage currents at low voltages has arisen. Although such have presented formidable obstacles, the process of this invention results in the formation of uniform films without significant defects, thus rendering it commercially practicable to employ films of minimum thickness in useful devices.

It is, therefore, one general object of this invention to improve capacitors.

It is another object of this invention to minimize size and increase values of capacitance.

It is still another object of this invention to improve the voltage breakdown characteristics of capacitors.

It is still a further object of this invention to improve methods of manufacture, increase reliability and facilitate reproducibility of capacitors.

It is still one further object of this invention to facilitate incorporation of high value capacitors in composite semiconductor devices.

Another object of this invention is to provide a process for evaporating pure titanium metal that can be carried out at relatively low temperatures.

Consequently, in accordance with one feature of the invention, an unusually high permittivity dielectric film of titanium dioxide is formed.

Other features reside in the methods of film formation. One such feature is that when a silicon substrate is used as one virtual plate of the capacitor, titanium and titanium dioxide can be advantageously deposited on the silicon, after which the work surface can be oxidized to entirely convert the deposited film to titanium dioxide. This results in a readily controllable film of desired cross-section without significant imperfections.

Another feature resides in the ease of forming various configurations using evaporative techniques, for the particles of deposited titanium and titanium dioxide travel essentially in straight lines and, therefore, lend themselves readily to the use of masks in forming desired configurations.

Still a further feature of the invention resides in the facility with which the method of dielectric formation can be employed in preparing capacitors in composite semiconductor networks.

These and other objects and features of the invention will be apparent from the following detailed description, by way of example, with reference to the drawings in which like parts are represented by like symbols and wherein.

Figures 1, 2, 3:
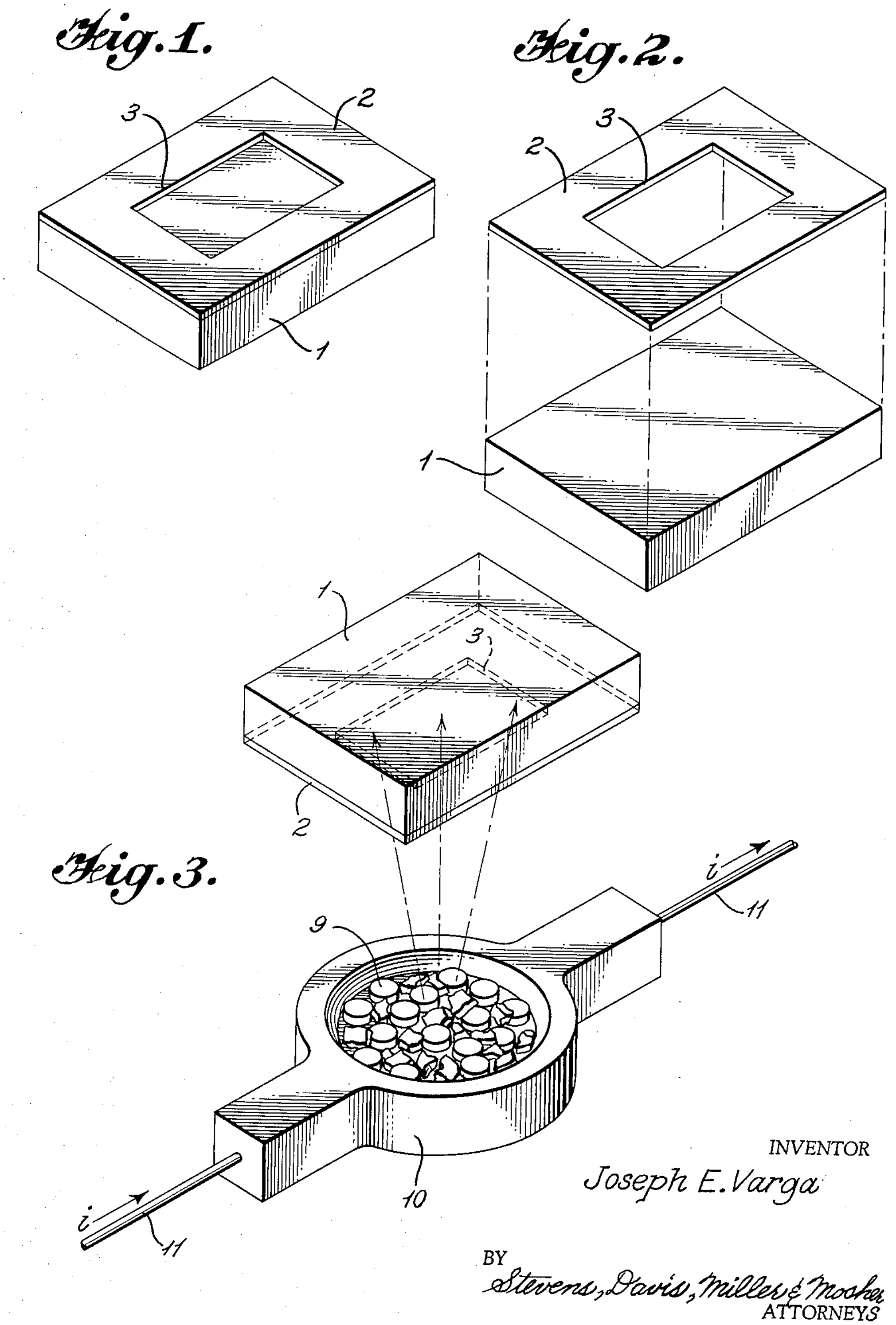
FIGURE 1 is a perspective view of a silicon wafer upon which is mounted a simple mask.
FIGURE 2 is an exploded view of the wafer and mask of FIGURE 1.
FIGURE 3 depicts the assembly of FIGURE 1 disposed in vapor-depositing relationship with a source of titanium and titanium dioxide.

Now, referring to the drawings, it is observed that FIGURE 1 depicts a wafer 1 of silicon upon which is mounted a conventional mask 2 having a simple rectangular aperture 3.

FIGURE 2 is an exploded view of the silicon wafer 1 and metal mask 2. It is desirable that the mask 2 be in intimate contact with the wafer 1 during the evaporation process. Although a metal mask is indicated as a means for masking during the evaporation process, other known masking techniques can be used to obtain the desired configurations. This masking procedure is represented in the flow diagram by block 101, FIGURE 8.

Figure 8:
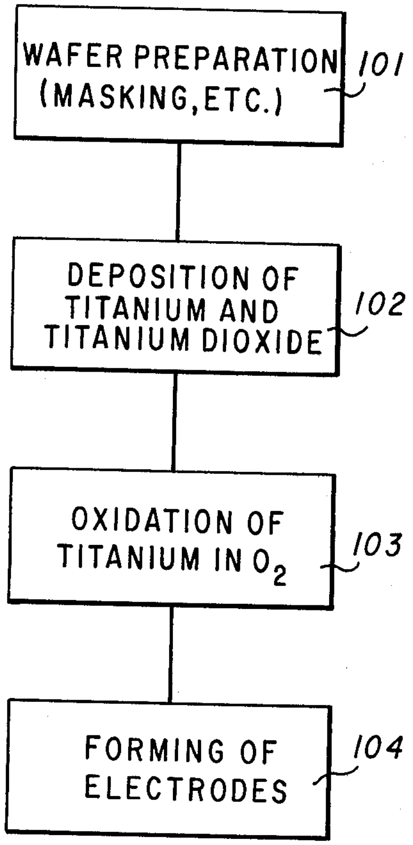
FIGURE 8 depicts a flow diagram of one method of the invention.

With the mask 2 in place, a combination of titanium and titanium dioxide is evaporated onto the silicon wafer 1 as shown in FIGURE 3, and represented by block 102, FIGURE 8. A combination of titanium and titanium dioxide has been found to yield much better results than could be attained if either titanium or titanium dioxide were used alone. Thus, if an attempt is made to use titanium dioxide alone, splashing will occur during the evaporation process, producing a film characterized by irregularities and a great number of voids or pin holes. On the other hand, if attempts are made to evaporate pure titanium, the temperatures and pressures required are such that they make the process undesirable.

If an approximately equal amount of pure titanium metal is added to the titanium dioxide before the evaporation process begins, no splashing will occur and the evaporative process can be practiced using temperatures normally used for evaporating titanium dioxide. The simultaneous deposition of the titanium and titanium dioxide results in controlled, uniform evaporation and deposition of thin films having closely packed and uniform structure with a minimum of pin holes therein.

Preferably, the titanium dioxide utilized in practicing the present invention is initially prepared in pellet form. The pellets can be formed by compressing the titanium dioxide by hand in a suitable jig. The pellets approximately the size of asprin tablets have proved suitable. After the pelelts have been formed, they are then degassed in a vacuum.

The degassed titanium dioxide pellets and an addition of pure titanium metal, the material represented by the numeral 9, are placed in a graphite boat or other suitable container 10 as shown in FIGURE 3. The composition of the mixture of titanium metal and titanium dioxide pellets used is not critical as the titanium dioxide is believed to function primarily as a carrier. Approximately equal amounts of titanium and titanium dioxide have been used with good results.

The material 9 can be heated by passing a current of sufficient magnitude through the boat 10 using the lead wires 11. Alternatively, a suitable heating coil or other means can be used to heat the combination of titanium and titanium dioxide. Silicon wafer 1 with attached mask 2 is placed in proper relation to the boat 10 as indicated in FIGURE 3.

Figure 4:
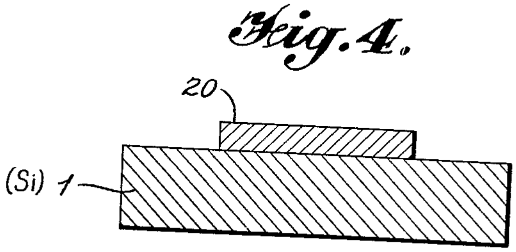
FIGURE 4 depicts the wafer with mask removed after the titanium, titanium dioxide deposition.

According to one specific example of the evaporation process, a vacuum of between $1\times10^{-4}$ and $5\times10^{-5}$ mm. of Hg was used. The pellets and titanium were heated to an evaporation temperature of 1650° C. and the silicon wafer 1 was maintained at a temperature of 300° C. A film of titanium and titanium dioxide of a thickness between 600–1200 angstrom units was deposited on the silicon wafer 1 after 20 minutes with the wafer placed about 8 inches from the boat 10. Of course, any combination of temperature and vacuum conditions that produce evaporation of the pellets can be used. After evaporation of titanium and titanium dioxide onto the silicon wafer 1, the mask was removed as shown in FIGURE 4. The silicon wafer 1 with the deposited titanium, titanium dioxide film 20 thereon was subsequently heated to about 800° C. in the presence of dry oxygen for approximately 8 hours. The heating step is represented by block 103, FIGURE 8.

Figure 5:
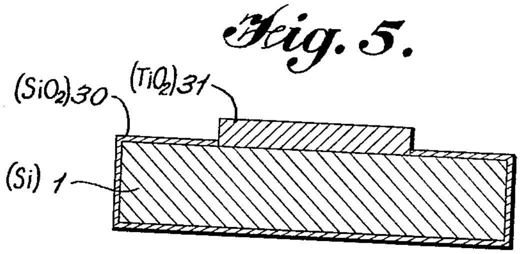
FIGURE 5 depicts the wafer after oxidation of the silicon wafer and titanium, titanium dioxide film.

The heating of the slice in the presence of dry oxygen oxidized the titanium metal present in the film to form a film consisting essentially of titanium dioxide. In other words, the titanium that was not previously an oxide was oxidized to form titanium dioxide, the structure of the reoxidized titanium dioxide film being essentially tetragonal in nature. The silicon wafer 1 was only oxidized to a very limited extent during the oxidizing process since silicon oxidizes appreciably only when the temperature is in excess of 1000° C. However, a very thin silicon dioxide film 30 was formed during the time that the titanium, titanium dioxide film 20 was converted to a titanium dioxide film 31 as shown in FIGURE 5.

Figure 6:
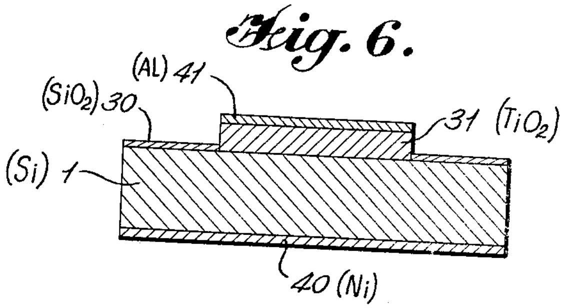
FIGURE 6 depicts the oxidized wafer and titanium dioxide film with electrically conductive material atop the titanium dioxide film and on the lower side of the wafer.

After oxidation the silicon wafer 1 was masked with wax and etched to remove the silicon dioxide film from the back side of the wafer. A mixture of 45 ml. of hydrofluoric acid, 300 ml. water, and 200 gms. of ammonium fluoride is an example of a suitable etch. Nickel was then electrolessly plated on the etched portion of silicon wafer 1 to form a nickel electrode 40 as shown in FIGURE 6. The nickel electrode 40 acts as an electrical contact for the virtual capacitor plate, silicon wafer 1. Alternatively, gold can be evaporated onto the silicon wafer and alloyed to form a good ohmic contact. It is only important that good electrical contact be made to the silicon wafer; other acceptable contacts can be used. The procedure for attaching the electrical contact is represented by block 104, FIGURE 8.

Aluminum was evaporated onto the titanium dioxide film 31 to form the other capacitor electrode denoted by numeral 41 in FIGURE 6. Electrical lead wires can be affixed to the nickel and aluminum electrodes by any standard bonding technique.

Although the process described for forming thin titanium dioxide films results in films having greatly improved characteristics over the prior art, the preparation of very thin films in many instances results in films having a few pin-holes. These microscopic holes can result in capacitors having leakage current at relatively low voltages if the metallic contact material when evaporated onto the film to form the electrical contact fills these holes, thereby providing a conducting path through the capacitor dielectric.

Figure 7:
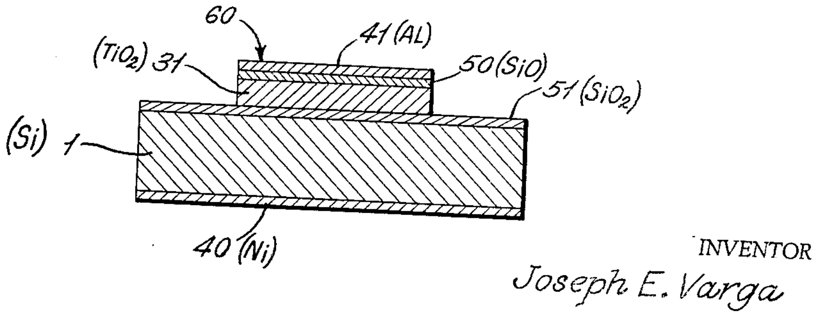
FIGURE 7 depicts a capacitor with evaporated and oxidized layers according to another embodiment of the invention.

An improvement in the capacitor described in conjunction with FIGURES 1 through 6 and 9 is provided by depositing a layer of non-conducting material prior to the evaporation of titanium dioxide onto the silicon wafer 1. Such an improved capacitor is shown in FIGURE 7. The improved capacitor shown in FIGURE 7 may be produced (block 106, FIGURE 9) by forming a thin, silicon dioxide layer 51 on the silicon wafer 1 prior to the evaporation of the titanium and titanium dioxide film (block 107, FIGURE 9), such as by heating the wafer in the presence of oxygen in excess of 1100° C. for approximately 30 minutes. Subsequently, the titanium dioxide film 31 is formed (block 108, FIGURE 9) on the silicon dioxide surface 51 as previously described. Since the silicon wafer itself is oxidized, a non-porous silicon dioxide film is formed, having virtually no pin-holes. The silicon dioxide layer 51 is an integral portion of the dielectric of the capacitor 60, the ratio of the thickness of titanium dioxide to silicon dioxide being about 10/3 for the specific example described. The various evaporation and oxidation times determine this ratio. The silicon dioxide layer reduces voltage breakdown due to microscopic holes in the titanium dioxide film 31.

Figure 9:
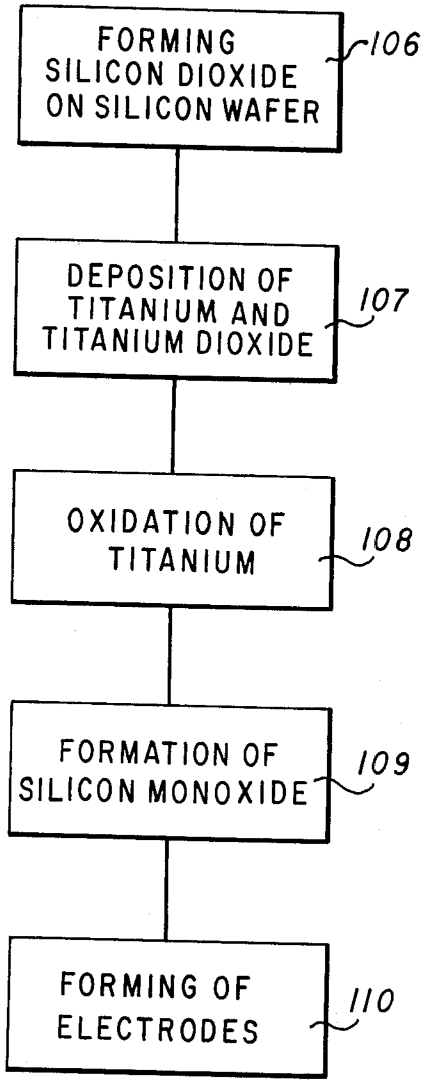
FIGURE 9 depicts a flow diagram of another method of the invention.

The capacitor of FIGURE 7 is also provided with a layer of silicon monoxide 50 (SiO) that is deposited by evaporation or other suitable means (block 109, FIGURE 9) on top of the titanium dioxide film 31, prior to the evaporation of the aluminum contact 41 (block 110, FIGURE 9). It has been found that aluminum forms a more intimate and stronger bond with silicon monoxide than with titanium dioxide and that silicon monoxide forms an excellent bond with titanium dioxide. Moreover, the silicon monoxide layer 50 becomes an integral portion of the dielectric of capacitor 60.

Other variations of the above processes that are obvious to one skilled in the art can be employed to produce capacitors with dielectrics composed of titanium dioxide, silicon dioxide, silicon monoxide or combinations thereof. For example, pure titanium can be evaporated onto a clean silicon wafer or a wafer whose surface has previously been oxidized to form a silicon dioxide layer. The titanium film can subsequently be converted to a titanium dioxide film by the procedure previously described. This technique does not result in the optimum characteristics because of the high evaporation temperature of pure titanium metal and resultant increase in pin-holes in the deposited film.

Another method for deposition of titanium dioxide films or substrates is to pass preheated titanium tetrachloride (preheated to about 60° C.) over a heated silicon substrate (heated to about 250° C.), thus decomposing the titanium tetrachloride and depositing titanium dioxide and titanium monoxide onto the substrate. Further oxidization as previously described is necessary to insure complete conversion of the deposited film to titanium dioxide.

The deposited titanium film can be oxidized by anodizing the silicon wafer in a bath of tartaric acid and ammonium hydroxide of pH of 5.5 after the titanium film has been deposited on the silicon wafer rather than by the use of heat.

Thus, although the invention has been described with regard to certain preferred embodiments, other methods and variations of capacitor designs using titanium dioxide may be employed without departing from the true scope and purpose of the present invention which is to be limited only by the appended claims.

What is claimed is:

1. A capacitor having a pair of electrodes and composite dielectric material disposed between said electrodes, said material being comprised essentially of vapor deposited silicon dioxide, titanium dioxide and silicon monoxide, said silicon dioxide being preponderantly disposed adjacent to and in contact with one of said electrodes, said silicon monoxide being preponderantly disposed adjacent to and in contact with the other one of said electrodes and said titanium dioxide being preponderantly disposed between said silicon dioxide and said silicon monoxide.

2. A capacitor as defined in claim 1 wherein the electrode adjacent said silicon dioxide is comprised essentially of silicon.

3. A capacitive element consisting of a silicon electrode, a first layer of silicon dioxide contiguous to said silicon substrate, a second layer of titanium dioxide contiguous said first layer, a third layer of conductive material contiguous to said second layer, and a conductive lead attached to said third layer.

4. A capacitor as defined by claim 3 wherein a fourth layer of silicon monoxide is interposed between said second layer and said third layer.

5. The method of making a capacitor comprising the steps of depositing titanium and titanium dioxide onto a silicon wafer, heating said wafer in the presence of oxygen to oxidize substantially all of said titanium and, thereafter, affixing electrodes to the oxidized deposit and said silicon wafer.

6. The method of making a capacitor comprising the steps of heating a silicon wafer in the presence of oxygen to form a surface layer of silicon dioxide, depositing titanium and titanium dioxide onto the oxidized silicon wafer, heating said wafer in the presence of oxygen to convert said titanium to titanium dioxide, and thereafter affixing electrodes to said titanium dioxide and said silicon wafer.

7. The method of making a capacitor comprising the steps of heating a silicon wafer in the presence of oxygen to form a layer of silicon dioxide, evaporating titanium and titanium dioxide onto the oxidized silicon wafer to produce a deposit, heating said wafer in the presence of oxygen to convert substantially all of said titanium to titanium dioxide, depositing silicon monoxide onto said deposit, and thereafter affixing electrodes to said silicon monoxide and said silicon wafer.

8. The method of making a capacitor comprising the steps of depositing titanium onto a silicon wafer, heating said wafer in the presence of oxygen to convert said titanium to titanium dioxide, and thereafter affixing electrodes to said titanium dioxide and said silicon wafer.

9. The method of making a capacitor comprising the steps of depositing at least one material selected from the group consisting of titanium and the oxides of titanium onto a conductive substrate, oxidizing the deposit to convert substantially all of said deposit to titanium dioxide, and forming a conductive electrode contiguous to said deposit.

References Cited by the Examiner

UNITED STATES PATENTS

| | | | |
|---|---|---|---|
| 1,781,033 | 11/30 | Ruben | 317—258 |
| 1,906,691 | 5/33 | Lilienfeld | 317—258 |
| 2,448,513 | 9/48 | Brennan | 317—258 |
| 2,497,066 | 2/50 | Brennan | 317—258 |
| 2,504,178 | 4/50 | Burnham | 317—258 |
| 2,590,893 | 4/52 | Sandborn | 117—221 |
| 2,593,829 | 4/52 | Arledter | 317—258 |
| 2,604,423 | 7/52 | Slotterback | 317—258 |
| 2,734,478 | 2/56 | Reynolds | 317—258 X |
| 2,754,230 | 7/56 | McLean | 317—258 |
| 2,960,642 | 11/60 | De Rudnay | 317—258 |
| 3,081,201 | 3/63 | Koller | 317—258 |
| 3,093,507 | 6/63 | Lander et al. | 117—106 |
| 3,094,650 | 6/63 | Riegert | 317—258 |
| 3,113,253 | 12/63 | Ishikawa | 317—258 |

JOHN F. BURNS, *Primary Examiner.*

LLOYD McCOLLUM, E. JAMES SAX, *Examiners.*